UNITED STATES PATENT OFFICE.

JONATHAN CONK, OF RED BANK, NEW JERSEY.

IMPROVED PACKING FOR JOURNAL-BOXES.

Specification forming part of Letters Patent No. 41,197, dated January 12, 1864.

*To all whom it may concern:*

Be it known that I, JONATHAN CONK, of Red Bank, in the county of Monmouth and State of New Jersey, have invented or produced a new and Improved Packing for Journal-Boxes and for other Purposes; and I do hereby declare that the following is a full, clear, and exact description of the same.

This invention is designed as a substitute for cotton waste and other similar fibrous materials which have hitherto been used as a packing for the journal-boxes of railroad-car axles, the shafting of machinery, and for other purposes where packing is applied in machinery.

The invention consists in the employment or use of the *Zostera marina*, the popular name of which is "grass-wrack" or "sea-eel grass," or other suitable sea-grass. This plant grows in bays or salt marshes, and for the purpose above specified is prepared simply as follows: The grass or plant, after being collected or gathered, is washed so as to deprive it of sand and other impurities which it may contain. It is then dried either in the sun or by artificial means, (a suitable stove or oven,) and, previous to or after being placed in the journal-box, or otherwise applied where it is to be used, is saturated with any of the oils or other lubricating substances usually applied to machinery.

This packing has been practically tested and has proved to be extremely durable, requiring to be removed only at comparatively long intervals. It may be obtained at a small price, the cost of gathering the plant or grass being trifling.

Having thus described my invention, what I claim as new, and desire to secure by Letters Patent, is—

A packing for the purpose specified, composed of the *Zostera marina*, (grass-wrack, sea-eel grass,) or other sea-grass, dried or cured and saturated with any suitable lubricating substance.

JONATHAN × CONK.
his mark.

Witnesses:
JAMES F. EARLE,
JOHN B. GROVER.